June 2, 1964  W. F. SCHOFIELD  3,135,523
ADJUSTABLE CHUCK JAW
Filed Dec. 17, 1962
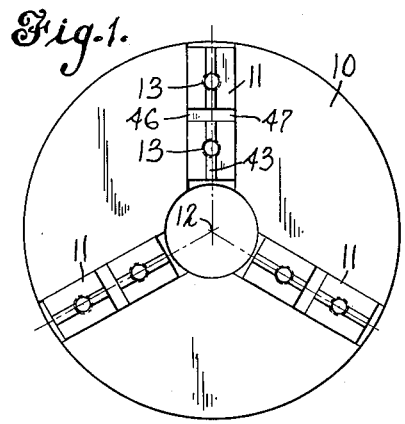
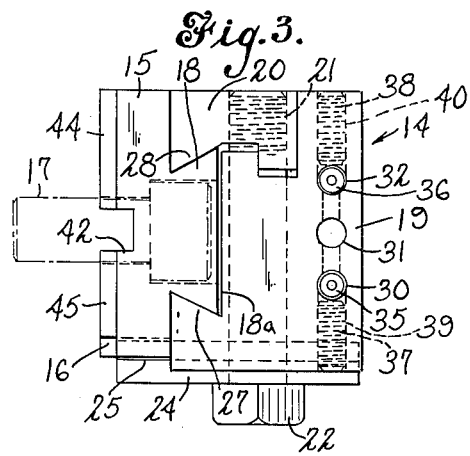
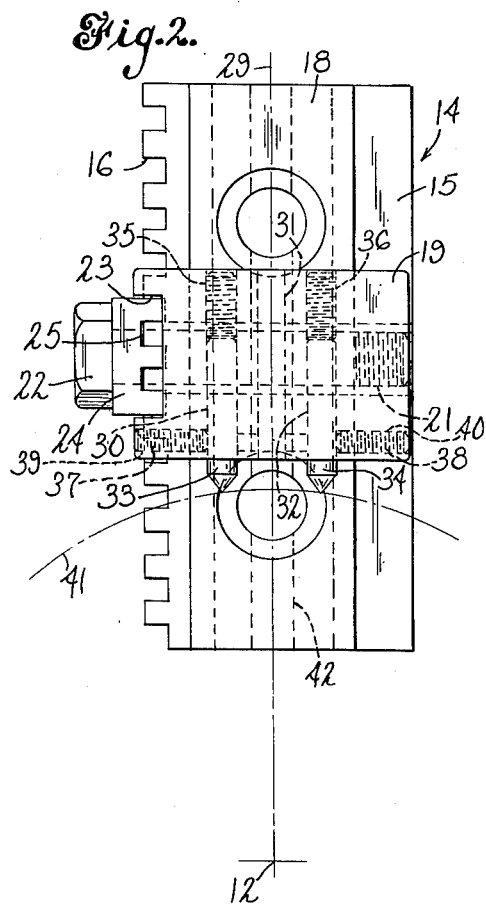
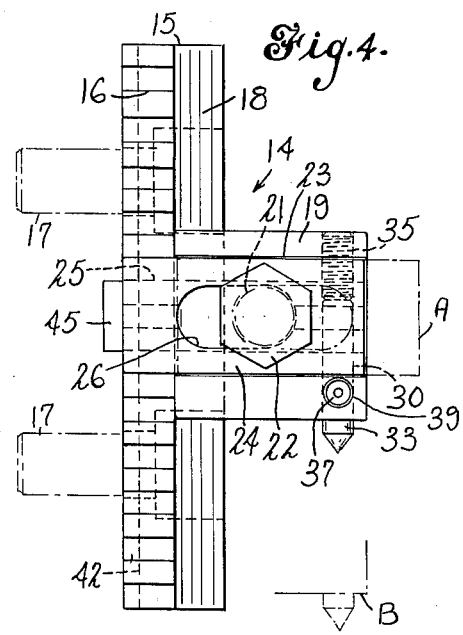
INVENTOR
William F. Schofield
BY
Spencer, Rockwell & Bartholow
ATTORNEYS

3,135,523
ADJUSTABLE CHUCK JAW
William F. Schofield, West Hartford, Conn., assignor to Pratt & Whitney Company, Incorporated, West Hartford, Conn.
Filed Dec. 17, 1962, Ser. No. 245,118
9 Claims. (Cl. 279—123)

This invention relates to chucks and more particularly relates to chuck jaws and adjusting means therefor.

The present invention provides a chuck and work-engaging jaws therefor which have facility for an increased range of adjustment to accommodate work pieces of widely varying dimensions. A chuck and jaws embodying this invention is of simple and economical construction and may rapidly be adjusted to engage a given workpiece. Moreover, chucks embodying the invention may be constructed with fixed or adjustable jaw slides.

Accordingly, it is an object of this invention to provide a new and improved work holding chuck and jaws therefor.

Another object of this invention is to provide new and improved work-engaging chuck jaws having a wide range of adjustment.

A further object of the invention is to provide new and improved chuck work-engaging jaws which may be rapidly adjusted through a wide dimensional range.

The invention accordingly comprises the features of construction, combination of elements, and arrangement of parts which will be exemplified in the construction hereinafter set forth, and the scope of the invention will be indicated in the claims.

For a full understanding of the nature and objects of the invention, reference should be had to the following detailed description taken in connection with the accompanying drawings, in which:

FIG. 1 illustrates a chuck arranged to receive a plurality of work-engaging jaws thereon in accordance with the invention;

FIG. 2 is a plan view of a work-engaging jaw assembly embodying the invention;

FIG. 3 is an end view of the jaw assembly of FIG. 2; and

FIG. 4 is a side view of the jaw assembly of FIG. 2.

To illustrate a preferred embodiment of the invention a chuck body member 10 is illustrated having a plurality of chuck jaw mounting members or slides 11 mounted thereon and equi-angularly spaced with respect to axis 12 of the chuck. Each of the jaw mounting members is provided with apertures 13 adapted to threadably receive bolts which secure work-engaging chuck jaw assemblies to the mounting members 11.

Secured to each jaw mounting member is a chuck jaw assembly 14 which comprises a longitudinally extending base member 15 having a series of equally spaced, uniform serrations 16 along one edge thereof. Base member 15 is adapted to be mounted on a jaw mounting member 11 by means of bolts 17 countersunk in dove-tail tongue 18 of base member 15 and extending therethrough to be received by apertures 13 in jaw mounting members 11.

The work-engaging portions of the jaw assembly 14 are adjustably movable on base member 15 and releasably lockable thereon in a selected position. Slidably mating with a dove-tail tongue 18 of base 15 is a jaw body 19 including a jaw body clamping member 20 held together by means of an adjusting bolt 21 threadably received in member 20 and extending through jaw body 19. Jaw body 19 and clamping member 20 together define an adjustable dove-tail groove $18_a$ receiving dove-tail tongue 18 of base member 15. Jaw body 19 is thus guidably movable longitudinally on base member 15. Bolt 21 has an accessible head 22 thereon which permits jaw body 19 and member 20 to be clamped about dove-tail tongue 18 or released from clamping engagement therewith to allow slidable movement of jaw body 19 and clamping member 20 longitudinally along base member 15. Further means are provided in accordance with the invention for releasably but positively locking jaw body 19 to base member 15 in selected positions. Received in a slot 23 defined in jaw member 19 and movable therein is a key member 24. Key member 24 is provided with accurately spaced, uniform serrations 25 which are arranged to mate with and register with serrations 16 on base member 15 and thereby lock key member 24 and jaw body 19 in selected positions with respect to base 15. Defined in key member 24 is an elongated slot 26 which receives a portion of the shank of bolt 21 therethrough to permit limited longitudinal movement of key 24 in slot 23 as exemplified by phantom outline A, FIG. 4.

Key member 24 is positioned in slot 23 such that the serrations 25 thereon may be moved into engagement with the serrations 16 of base member 15 and thereby lock jaw body 19 against movement on base member 15. When it is desired to adjust the position of jaw member 19 on base member 15, bolt 21 by means of head 22 thereon may be unloosened and key member 24 moved perpendicular to the length of base member 15, as indicated, such that serrations 25 are withdrawn from engagement with serrations 16. Jaw body 19 may then be moved longitudinally on base member 15 to a desired position, as indicated by the phantom outline B, FIG. 4, at which time key member 24 is moved so that serrations 25 thereon move into locking engagement with serrations 16 on base member 15. Upon tightening of bolt 21, portions 27 and 28 of jaw body 19 and clamping member 20, respectively, tightly engage the dove-tail tongue 18 of base member 15 and securely lock the body member 19 to base member 15.

It may be seen that the arrangement described provides a very rapid adjustment of the position of jaw body 19 and also lends itself to a wide range of dimensional adjustment which may be rapidly accomplished. If desired, the base member 15 may be marked with graduations along the length thereof to indicate a dimension from axis 12.

Jaw body 19 is arranged to carry or support work-engaging means. Defined in jaw body 19 parallel to axis 29 of base member 15 are slots 30, 31 and 32, adapted to receive work-engaging pins. As illustrated, work-engaging pins 33 and 34 are received in slots 30 and 32, respectively, longitudinally positioned therein by means of adjusting set screws 35 and 36, threadably received in slots 30 and 32 respectively, and bound therein by means of binding set screws 37 and 38 threadably received in slots 39 and 40, respectively. The pins 33 and 34 are adapted to engage and hold a workpiece inserted in the chuck as exemplified by the broken line 41. In some instances it may be desired to use only one work-engaging pin in which case such pin, not shown, would be received in slot 31 and adjusted and bound therein in the same manner as illustrated for pins 33 and 34.

To ensure that each base member 15 is accurately positioned on an associated mounting member or slide 11, base member 15 is further provided with a slot 42 adapted to receive therein a tongue 43 extending longitudinally on a jaw mounting member or slide 11. Base member 15 is further provided with spaced-apart tongues 44 and 45, perpendicular to slot 42 which are adapted to be received in slots 46 and 47, respectively, of jaw mounting members or slides 11.

The jaw mounting members or slides 11 may be fixed in position or may be arranged for fine adjustment as exemplified in Patent No. 2,917,314, assigned to the same assignee as the present invention.

A preferred embodiment of the invention which efficiently attains the objects set forth as well as others made apparent from the foregoing disclosure has been illustrated and described for purposes of disclosure. However, other embodiments of the invention as well as modifications to the disclosed embodiment thereof may occur to others skilled in the art which do not depart from the spirit and scope of the invention. Accordingly, it is intended that the appended claims cover all embodiments and modifications of the invention which do not depart from the spirit and scope of the invention.

What is claimed is:

1. A chuck comprising a body member, a plurality of radially extending angularly spaced jaw mounting members on said chuck, a jaw assembly on each of said mounting members comprising a longitudinally extending base member having a series of uniform serrations along a side thereof, a jaw body member guidably movable longitudinally on said base member, a key member carried by said jaw body member having serrations thereon arranged to mate with the serrations on said body member, said key member being movable on said jaw body member toward and away from said base member whereby said serrations of said key member may engage or be withdrawn from engagement with the serrations of said base member.

2. A chuck comprising a body member, a plurality of radially extending angularly spaced jaw assemblies, each of said jaw assemblies comprising a longitudinally extending base member having a series of uniform serrations along a side thereof, a jaw body member guidably movable longitudinally on said base member, a key member carried by said jaw body member having serrations thereon arranged to mate with the serrations on said body member, said key member being movable on said jaw body member toward and away from said base member whereby said serrations of said key member may matingly engage or be withdrawn from engagement with the serrations of said base member.

3. A chuck jaw assembly comprising a longitudinally extending base member having a series of uniform serrations along a side thereof, a jaw body member guidably movable longitudinally on said base member, a key member carried by said jaw body member having serrations thereon arranged to mate with the serrations on said body member, said key member being movable on said jaw body member toward and away from said base member whereby said serrations of said key member may engage or be withdrawn from engagement with the serrations of said base member.

4. The jaw assembly of claim 3 wherein said base member has a dove-tail tongue along the length thereof received in a dove-tail groove defined in said jaw body and means for locking said tongue in said groove.

5. The jaw assembly of claim 3 wherein said jaw body includes a clamping member, said jaw body and said clamping member defining a groove therethrough receiving a tongue on said base member therein and means for clamping the walls of said groove on said tongue.

6. The jaw assembly of claim 5 wherein said clamping means comprises a bolt extending through said jaw body and threadably received in said clamping member.

7. The jaw assembly of claim 6 wherein said bolt secures said key member to said jaw body, said key member being provided with an elongated slot receiving said bolt therethrough, whereby said key member is slidable on said jaw body toward and away from the serrations of said base member.

8. The jaw assembly of claim 7 wherein said key member is disposed and slidable in a slot provided therefor in said jaw body.

9. The jaw assembly of claim 3 wherein said jaw body has work-engaging pins mounted therein and extending therefrom.

References Cited in the file of this patent

UNITED STATES PATENTS

| | | |
|---|---|---|
| 2,401,971 | Schuster | June 11, 1946 |
| 2,687,308 | Highberg | Aug. 24, 1954 |
| 2,869,884 | Etchell | Jan. 20, 1959 |
| 2,965,384 | Lowe | Dec. 20, 1959 |